Jan. 24, 1967   D. E. JOHNSON ET AL   3,299,759
MITER CUTTER
Filed July 20, 1965
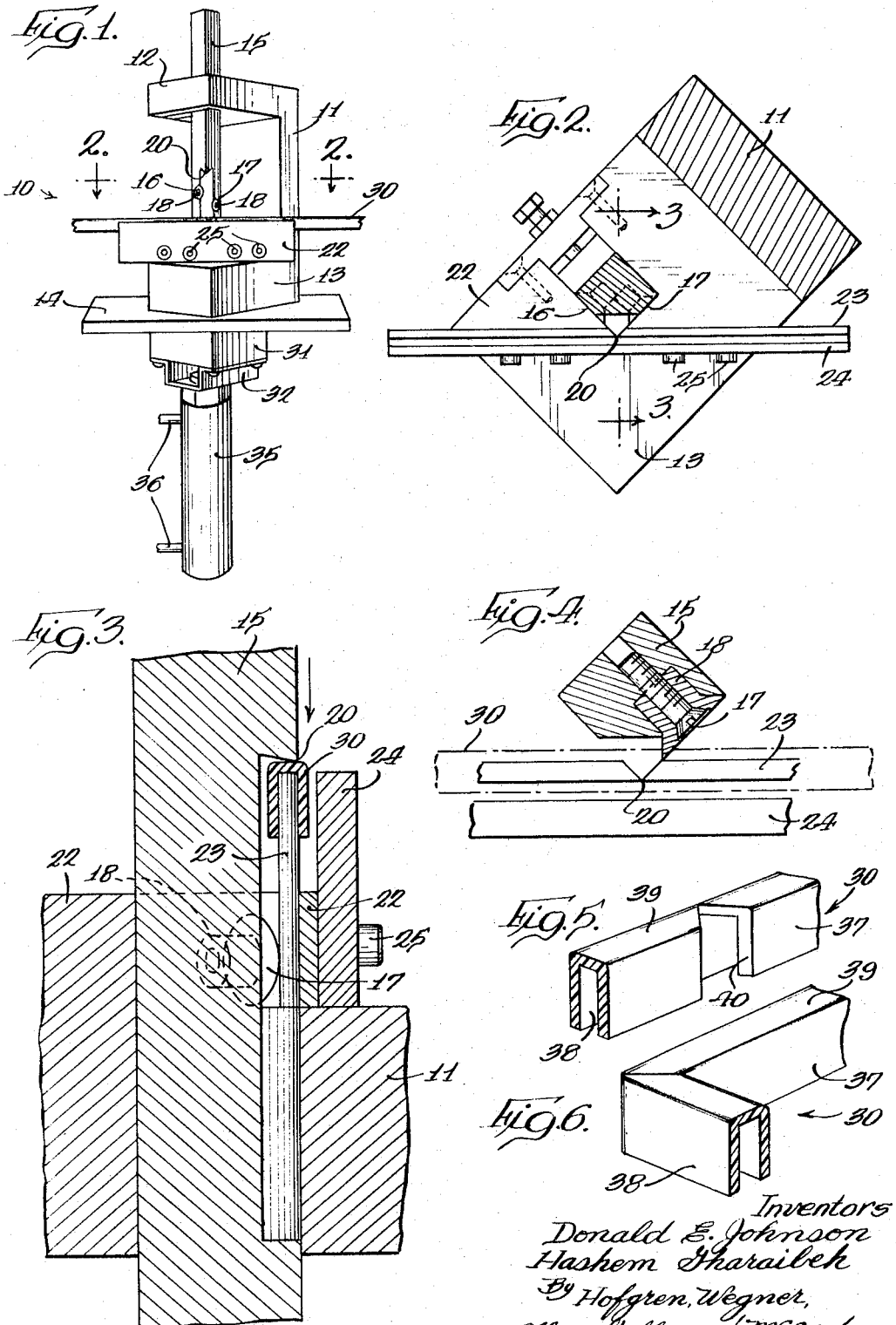
Inventors
Donald E. Johnson
Hashem Gharaibeh
By Hofgren, Wegner,
Allen, Stellman & McCord
Attys United States Patent Office 3,299,759
Patented Jan. 24, 1967

3,299,759
MITER CUTTER
Donald E. Johnson, Kenosha, Wis., and Hashem Gharaibeh, Chicago, Ill., assignors to Warwick Electronics Inc., a corporation of Delaware
Filed July 20, 1965, Ser. No. 473,428
8 Claims. (Cl. 83—581)

This invention relates to a miter cutter and more particularly to a device which partially cuts and notches a strip of material such as plastic to facilitate bending such strip while still in one piece with formation of a mitered joint at the bend.

For example, the device can be used to miter spaced parts of a molded or extruded U shaped plastic strip. Such a strip, having mitered corners, can be used for ornamental or decorative purposes by being placed in one continuous piece on the three sides of the front of a television cabinet or the like, so that wherever the strip is bent, the two legs of the strips will extend at a 90° angle with the cut between them being at a 45° angle. A plastic strip used as an ornamental trim on television cabinets or the like has the advantages of low cost and non-tarnishing finish. But, heretofore, in order to place an ornamental plastic strip on the three sides of the front of a television cabinet, the strip could not be used in one continuous piece but had to be made in three separate sections, one for each side, each section having a mitered end. A difficulty was encountered in the use of such sections since they did not mainain a dimensional stability once the miter cut had been made. The dimensional stability was destroyed at the point where one section makes contact with the other due to the absorption of moisture from the atmosphere by the sections. Thus a properly mitered joint could not be maintained. It was found that by cutting one of the walls of the strip before notching the face thereof a proper mitered joint could be formed and the strip could be bent without tearing of the strip at the bend.

An object of this invention is to provide a new and improve miter cutter which will cut and notch channel-like strips preparatory to making a properly mitered joint.

Another object of this invention is to provide a device for sequentially partially cutting spaced parts of a plastic strip and notching an intermediate part to provide a shape which will form a mitered joint.

Still another object of this invention is to provide a device for cutting and notching strips which is accurate, easly installed and operated, safe to the operator and inexpensive in its construction and operation.

Further objects and advantages will become apparent from the following detailed description taken in connection with the accompanying drawing in which:

FIG. 1 is a perspective view in elevation of the device of this invention;

FIG. 2 is a horizontal section on an enlarged scale taken generally along the line 2—2 of FIG. 1;

FIG. 3 is a vertical section on an enlarged scale taken generally along the line 3—3 of FIG. 2;

FIG. 4 is a fragmentary view on an enlarged scale showing a notcher, a cutter, a strip and the strip guides in accordance with this invention;

FIG. 5 is a perspective view of a strip on an enlarged scale after it has been cut and notched according to this invention; and FIG. 6 is a perspective view of a strip bent to form a mitered joint acording to this invention.

While this invention is susceptible of embodiment in many different forms, there is shown in the drawing and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to the drawing, FIG. 1 shows a device generally designated 10 for cutting and notching a strip. A frame 11 has a general U configuration having legs 12 and 13 with the leg 13 resting on a flat rectangular base 14. A generally square elongate plunger 15 is mounted for reciprocation within the frame legs by extending through the upper leg 12 of the frame 11 and through the lower leg 13 of said frame 11. A pair of adjustable stationary circular cutters 16 and 17 are mounted on two adjacent sides of the plunger 15, the cutters 16 and 17 being vertically spaced apart from each other and located at an angle to one another. The cutters are secured to the plunger 15 by Allen screws 18 or the like, as best seen in FIGS. 1 and 3. The entire peripheries of the cutters 16 and 17 are ground into cutting edges even though only a part of the periphery of each cutter is used for cutting at one particular time. Having the cutting edge around the entire periphery of a cutter makes it convenient to adjust the cutter and provide a new sharp edge when the edge which had been used becomes dull. The mechanics of adjustments of these cutters will be explained later.

A notcher or notching tool 20 is recessed in the face of the plunger 15 between and above the cutters 16 and 17. The notcher 20 is of a general V shape and having an included angle of 90° and is formed on the plunger 15 itself.

A strip holder 22 having strip guides 23 and 24 is mounted on top of the lower leg 13 of the frame 11 and secured to the frame 11 by bolts 25 or the like. The strip guides 23 and 24 of the strip holder 22 are elongate rail-like structures used to maintain a strip 30 which is to be cut and notched by this device in a proper position. The strip guides 23 and 24 can best be seen in FIGS. 2–4.

A block 31 is attached to the bottom of the base 14, said block 31 having a bracket 32 secured thereunder to provide a mounting means for a cylinder 35. A suitable releasable connection is provided between the piston of cylinder 35 and the plunger 15, the piston being used to provide a reciprocating motion to the plunger 15. The cylinder 35 has spaced air line connectors 36 connected to a source of air under pressure.

Referring now to FIGS. 5 and 6, the strip 30 has an inverted U configuration composed of the walls 37 and 38 and a face or top 39.

In the operation of the device with the strip 30 held in the strip holder 22, the cylinder 35 lowers the plunger 15. As the plunger 15 descends in the cutting stroke, the cutter 17 cuts through the leg 37 of the strip 30, as shown in FIG. 5, and as the plunger 15 descends still further the circular cutter 16 makes a cut through the same leg 37 of the strip 30 but spaced apart from the previous cut made by the cutter 17. During further downward movement of the plunger 15 the notcher 20 engages the face, or the top 39 of the strip 30 and notches out a triangular portion thereof. The triangular portion notched out by the notcher 20 is located above and between the two cuts made through the leg 37 by the cutters 16 and 17. The cutters 16 and 17 are positioned at right angles to one another and the same angle is made on the cross sections 40 of the strip leg 37.

Subsequent to the above cutting and notching operation, the strip 30 is bent at a 90° angle, as shown in FIG. 6, the cut forming an angle of 45° to the strip edges. As an example, a desired length of such strip having the necessary number of bends can be placed around the three sides of the front of a television cabinet for ornamental purposes.

As one of the features of this invention the rotary cutters 16 and 17 can be used for a comparatively long time without necessitating a replacement.

The method of mounting these cutters has been discussed heretofore thus, only the method of adjustment of these cutters will now be explained, but since the adjustment for both cutters is the same, a reference will be made herein to a specific adjustment for one cutter.

After a period of use the cutting edge of a cutter will become comparatively dull. When this situation arises, the screw 18 is loosened and the cutter rotated a required amount until the used portion of the cutting edge is replaced by an unused portion which will be used to make the future cuts of the strip 30. Following the necessary rotating of the cutter, the screw 18 is again tightened to properly secure the cutter to the side of the plunger 15.

We claim:

1. A device for cutting and notching a plastic strip comprising, a frame, a plunger mounted for reciprocation on said frame, a pair of cutters mounted on said plunger, and a notching tool located on said plunger between said cutters and having its lowermost surface at a distance above said cutters to operate on the strip after said cutters.

2. A device for cutting and notching a strip of material comprising, a frame having a plunger mounted for reciprocation, a pair of adjustable stationary circular cutters mounted on said plunger at right angles to each other, and a notching tool having an included angle of 90° recessed in said plunger above said cutters.

3. A device for cutting and notching a plastic strip having a wall and a face generally normal to each other comprising, a frame having an elongate plunger mounted for reciprocation, a pair of stationary circular cutters mounted on said plunger in spaced apart angular relationship, a notching tool located on the face of said plunger and above said cutters, a strip holder for holding a strip therein, means for moving said plunger in a direction whereby said cutters and said notching tool are moved toward the holder, said cutters cutting through a wall of said strip in spaced apart locations, said notching tool removing a part of the face of said strip above and between said cuts made by said cutters.

4. A device for cutting and notching a substantially U shaped strip comprising, a frame having an elongate generally rectangular plunger mounted for reciprocation, a pair of stationary circular cutters mounted on the opposite sides of said plunger, said cutters being vertically spaced apart from each other, a notching tool recessed in the face of said plunger a distance above the upper of said cutters, a substantially U shaped strip holder for holding a strip in an inverted position, means for moving said plunger in a vertical direction relative to said frame to permit said cutters and said notching tool to move downwardly, said cutters cutting through a wall of said strip in spaced apart locations, said notching tool removing a part of the face of said strip above and between said cuts made by said cutters.

5. A device for cutting and notching a strip having a wall and a face generally normal to each other comprising, a frame having a generally square shaped elongate plunger mounted for reciproction, a pair of stationary circular cutters mounted on the opposite sides of said plunger, said cutters being vertically spaced apart from each other, a notching tool located on the face of said plunger a distance above the upper of said cutters, a strip holder for holding a strip therein, means for reciprocating said plunger in a direction to permit said cutters and said notching tool to move toward the strip, said cutters producing spaced apart cuts in the wall of the strip, and said notching tool removing a triangular section from the face of the strip above and between said cuts produced by said cutters.

6. A device for cutting and notching a strip comprising, a frame movably mounting a generally square shaped elongate plunger, a pair of stationary circular cutters mounted on two opposite sides of said plunger, said cutters being vertically spaced apart from each other, a notching tool recessed in the face of said plunger a distance above the upper of said cutters, a strip holder having a coacting knife edge for each of said cutters and holding a strip therein, means for moving said plunger in a vertical direction to permit said cutters and said notching tool to move downwardly, said cutters producing spaced apart cuts in the wall of said strip, and said notching tool removing a triangular section from the face of said strip above and between said cuts resulting in a gap in the wall and the face of said strip to form a mitered joint by folding said strip at the location of said gap.

7. A device as defined in claim 6 wherein each of said cutters has a cutting edge around its periphery and releasable means mounting said cutters on said plunger whereby said cutters can be rotated to provide new cutting edges.

8. A device for cutting and notching a strip of material comprising, a frame, a plunger movably mounted on said frame, a pair of circular cutters mounted on said plunger and extending at an angle to each other, and a notching tool recessed in the plunger above said cutters and having an included angle equal to said angle.

References Cited by the Examiner
UNITED STATES PATENTS

| | | | |
|---|---|---|---|
| 1,289,485 | 12/1918 | Lewis | 83—699 |
| 1,342,240 | 6/1920 | Walter | 83—699 |
| 1,351,115 | 8/1920 | Morse | 83—683 |
| 1,513,100 | 10/1924 | Frederick | 83—917 |

WILLIAM W. DYER, JR., *Primary Examiner.*

L. B. TAYLOR, J. M. MEISTER, *Examiners.*